US009728088B2

(12) United States Patent
Vítor

(10) Patent No.: US 9,728,088 B2
(45) Date of Patent: Aug. 8, 2017

(54) METHOD TO OPERATE A SYSTEM OF CATEGORIZATION/DEGRADATION OF OPERATING PROCEDURES FOR LOW VISIBILITY (LVP) OF AN AIRPORT RUNWAY

(71) Applicant: 3SP—INVESTIGAÇÃO E DESENVOLVIMENTO DE TECNOLOGIAS, LDA, Lisbon (PT)

(72) Inventor: Pedro Rafael Bonifácio Vítor, Lisbon (PT)

(73) Assignee: 3SP—SELF SUFICIENT SYSTEMS PROJECTS—INVESTIGAçÃO E DESENVOL VIMENTO DE TECHNOLOGIAS, LIMITADA, Lisbon (PT)

( * ) Notice: Subject to any disclaimer, the term of this patent is extended or adjusted under 35 U.S.C. 154(b) by 3 days.

(21) Appl. No.: 14/705,862

(22) Filed: May 6, 2015

(65) Prior Publication Data

US 2015/0235558 A1 Aug. 20, 2015

Related U.S. Application Data

(63) Continuation of application No. PCT/PT2013/000064, filed on Nov. 7, 2013.

(30) Foreign Application Priority Data

Nov. 8, 2012 (PT) .......................... 106631

(51) Int. Cl.
*G08G 5/00* (2006.01)
*G06F 11/20* (2006.01)
*G08G 5/02* (2006.01)

(52) U.S. Cl.
CPC ....... *G08G 5/0026* (2013.01); *G06F 11/2038* (2013.01); *G06F 11/2048* (2013.01);
(Continued)

(58) Field of Classification Search
CPC .. G08G 5/0026; G08G 5/0095; G08G 5/0091; G08G 5/025; G08G 5/00; G06F 11/2048; G06F 11/2038; G06F 11/2007
(Continued)

(56) References Cited

U.S. PATENT DOCUMENTS 5,719,567 A 2/1998 Norris, Jr.
5,719,667 A * 2/1998 Miers ................. G01N 15/1436
356/338
(Continued)

FOREIGN PATENT DOCUMENTS

JP 2008 110759 A 5/2008
WO WO 2006/070207 A1 7/2006
(Continued)

*Primary Examiner* — Nga X Nguyen
(74) *Attorney, Agent, or Firm* — Leason Ellis LLP

(57) ABSTRACT

A method to operate a system in support of air traffic control of an airport provides, automatically, to operators, in the same screen, status information for the systems required during low visibility operation, meteorological information and runway category of operation, making easier the operation of the controller and increasing airport security. The method comprises monitoring the status of all low visibility operation systems, calculation of a category more convenient for the operation of the airport runway, and degradation automatic (down grade) when it degrades a key system and upgrade or downgrade manually the category by operator decision. The method includes an architecture oriented for high availability with three blocks (Management, Input/Output and Visualization) and uses an application "alive" that performs automatic switching between servers, in case (Continued)

of failure or malfunction of one of them, increasing the availability of the system.

6 Claims, 13 Drawing Sheets

(52) U.S. Cl.
CPC ......... *G08G 5/0091* (2013.01); *G08G 5/0095* (2013.01); *G08G 5/025* (2013.01)

(58) Field of Classification Search
USPC .................................................. 701/120, 36
See application file for complete search history.

(56) References Cited

U.S. PATENT DOCUMENTS

| | | | |
|---|---|---|---|
| 6,463,383 B1 | 10/2002 | Baiada et al. | |
| 6,604,030 B1 * | 8/2003 | Davis | G06F 11/2007 244/158.1 |
| 2009/0201190 A1 | 8/2009 | Huthoefer et al. | |
| 2011/0106345 A1 | 5/2011 | Takacs | |

FOREIGN PATENT DOCUMENTS

| | | | |
|---|---|---|---|
| WO | WO 2010/025825 A2 | 3/2010 | |
| WO | WO 2011/056795 A2 | 5/2011 | |

\* cited by examiner

METHOD TO OPERATE A SYSTEM OF CATEGORIZATION/DEGRADATION OF OPERATING PROCEDURES FOR LOW VISIBILITY (LVP) OF AN AIRPORT RUNWAY

CROSS-REFERENCE TO PRIOR APPLICATION

This application is a continuation under 35 U.S.C. Section 120 of International Patent Application No. PCT/PT2013/000064, filed on Nov. 7, 2013, and claims benefit of Portuguese Application No. 106631, filed on Nov. 8, 2012 all of which are hereby incorporated by reference in the entireties

TECHNICAL FIELD OF THE INVENTION

Recent statistical data show that 62% of aviation accidents involving large aircrafts are caused by human error.

Included in this result are all known factors: failure of training, stress, fatigue, inattention, recklessness, malpractice, negligence, error of judgment, faulty planning, poor supervision, lack of coordination between the crew, communication failure, improper operation of the equipment and others.

The technology has been, over the years, used to replace routine tasks previously performed by humans as a way of minimizing human errors, contributing decisively to increase the safety of air transport.

The operation of low visibility landing in one airport is one of the most complex and largest technological involvement, ensuring continuity of airport operation, even in adverse weather conditions.

The airport runways operate according to weather conditions, status of equipment for landing support and other equipment important in these situations. So runways operate from category one (CAT I) in situations of good visibility up to category three (CAT III) in low visibility situations where the aircraft needs of all means of support to land fully automatically and with maximum safety.

The operation of an airport in low visibility requires complex procedures that ensure that there is no fault in the equipment and essential means available by the airport, which are key factors for safe operation. The monitorization of equipment, accompanied by the detection of failures or events that could endanger the operation are variables that determine the operational categorization/degradation of the airport runway in low visibility operations.

The procedures mentioned above are called low visibility procedures (LVP).

The higher is the level of category of operation of an airport runway more is required in the operation of equipment, considering that for each category the equipment and other elements involved must be available and with a certain level of operation. On the other hand, weather conditions define the minimum operating category of the airport runway, ie the category has to increase as the weather and visibility conditions worsen.

Currently the operational procedure for categorization/degradation of a runway is non-automatic, requiring, by the controller, to check the status and other equipment parameters and the analysis of documentation (tables) so that the controller can decide the category level of operation of the airport runway.

The present invention named LVP system is a method to operate a system based on a set of equipment and computer programs that monitor the condition of equipment and systems needed in low visibility operation and the weather condition primarily related to aircraft's runway visibility, providing information for airport controllers which category the airport must operate with maximum safety.

The invention allows the operation of a system that interfaces with different equipment and means; collects and stores information from these systems; processes the information through a management module; and, finally, presents users (controllers and technicians from the airport) information relevant for low visibility operation.

The LVP system has a modular architecture and fault tolerant, operates in real-time reacting quickly to the different events, the software is based on an open source structure and is based on mature and secure technologies.

The technical field of the invention belongs to the fields of electrical engineering, network engineering, computer systems engineering and computer engineering.

BACKGROUND OF THE INVENTION

The operational categorization/degradation procedure of the category of operation of an airport runway is performed in a manual way.

The controller checks the status of the equipment and the weather conditions, analyzes this information using documentation (tables) and decides the category operation of the airport.

This process, using support equipment, is performed manually, so susceptible to human error, and there is till now a system that performs these functions automatically.

In a survey carried out to documents related with patents whose subject is related to this request of patent led to the identification of the following documents:

D1—U.S. Pat. No. 6,463,383 (B1)—Method and system for aircraft flow management by airlines/aviation authorities;

D2—JP2008110759 (A)—Airport control support system;

D3—WO 2010025825 (A2)—Airport control device and method for controlling flight operations at an airport;

D4—WO 2011056795 A2—Low visibility landing system and method;

D5—WO 2006070207 A1—Airport safety system;

D6—U.S. Pat. No. 5,719,567 A—System for enhancing navigation and surveillance in low visibility conditions;

D7—US 20110106345 A1—Low visibility landing system.

Document D1 describes a method is presented for managing, in real time, the arrival and departure of a plurality of aircraft to and/or from a specified system resource (e.g., an airport, gate, section of airspace) or set of system resources based upon consideration of:

the surrounding weather conditions, specified data regarding the system resource, and the plurality of aircraft and their operational and safety goals.

This method comprises the steps of:

(a) collecting and storing the specified data and weather conditions;

(b) processing the specified data and weather conditions to predict the aircraft's arrival fix times;

(c) using these predicted arrival fix times to compute the value of a specified goal function which is a measure of how well the aircraft will meet their safety and operational goals if they achieve the predicted arrival fix times;

(d) optimizing the goal function with respect to the predicted arrival fix times by identifying potential temporal changes in the predicted arrival fix times so as to better optimize the value of the goal function;

(e) translating these temporal changes into a new set of targeted arrival fix times or enroute speeds as necessary to meet the targeted arrival fix times for the aircraft;

(f) communicating the new targeted arrival fix times or enroute speeds as necessary to meet the targeted arrival fix times to the aircraft so that these temporal changes may be implemented;

(g) monitoring the system resource capacity, aircraft and weather to identify predicted changes in the targeted arrival fix times or system resource capacity which will result in a specified decrease in the value of the optimized goal function; and (h) if such monitoring identifies that the specified decrease in the value of the optimized goal function is predicted to occur, repeat the above steps.

The present patent application differs from D1 because D1 discloses a method and a system of air traffic management for aircrafts used by airlines and aviation authorities resulted from the need to optimize the arrival times of aircrafts, ensuring also the best safety conditions.

Otherwise, the present application is a system that ensures low visibility operation of an airport runway, as it calculates automatically or manually the category of operation depending on the status of various systems and weather conditions. Meteorological data, external resource, are used to calculate the category level of operation of the airport runway, which are not used for traffic management and optimization time of the arrival of the aircraft as is disclosed in document D1.

The document D2 presents a ground control support system control promptly providing support information required for a controller even during rush hour and poor visibility, reducing a burden on the controller and securing efficient operation of an airport.

It is based on ground radar information acquiring objects including moving bodies on the ground inside the airport; a monitoring control device having a monitoring screen and a radar acquiring button; and an image analyzing device identifying an image data position of the objects acquired by the airport ground radar when the radar acquiring button is operated and displaying the necessary information on the moving bodies currently acquired by the radar on the monitoring screen of the monitoring control device based on the image data position, operation plan information on the respective moving bodies prepared beforehand and sensor information on an aircraft sensor installed in the airport.

The present application differs from D2 since D2 discloses a system for managing ground traffic of an airport, identifying all moving objects within the airport by a ground radar providing information through a diagram shown to the controller and the present application is a management system for low visibility operations, categorizing/degrading the operation of the airport runway.

Both systems give support to the management of an airport, which provide supporting information to the controller, however they work in two distinct areas, D2 is related to the control area of ground objects, looking forward to road traffic management while the present patent application relates to the category-level operation of the airport runway looking forward low visibility landing operations, since it focuses on the management of all systems for landing in low visibility conditions.

The document D3 discloses an apparatus for controlling the airport and a method for controlling flight operations in the airport. Relates to an airport control device having a central database comprising a plurality of control data relevant to flight processing, and having a plurality of computer-aided subscriber devices (TOP) connected to the central database, each configured for planning and controlling a specialized partial process of flight processing, and having at least one analysis unit for analyzing the future traffic situation at the airport, considering control parameters related at least to a partial process of flight processing and desired by a subscriber device (TOP), and the control data present in the database. The subscriber devices (TOP) are further configured for analyzing desired control parameters using the at least one analysis unit, and for computer-aided negotiation of each of the desired control parameters, such that planning suggestions for flight processing that can be analyzed can be modified, accepted, or declined by the subscribed subscriber devices (TOP) by changing control parameters in an iterative process by means of the at least one analysis unit.

The present patent application differs D3, because D3 describes a system for processing flight data, using a centralized database, with information relevant for processing flight and the present application uses also a database that stores different information that is related to the status of relevant systems for low visibility operations and meteorological information.

Document D4 discloses a system and method for low-visibility landing which gives support to the pilot during the landing operation with low visibility conditions such that the aircraft can descend to lower altitudes without visual contact with the runway. The system can use several navigation systems to produce a hybrid signal that can be more stable than the individual signals of these navigation systems. D4 is a system and method directed to the pilot in low visibility operations and the present application is focused on providing information to the air traffic controller, although both systems relate to the landing operations of low visibility, but have totally different goals and characteristics.

Document D5 describes a security system of an airport, including ground radar to monitor the movement of aircraft, which provides the input signal to a computer arranged to identify the relative movements of aircraft and other vehicles detected by the radar, according to a set of rules pre-programmed risk of collision of an aircraft. The same reasons as for the document D2, document D5 also does not compare with the present application relate to the control area of an airport ground objects.

Document D6 discloses a system for enhancing navigation or surveillance in low visibility conditions through the use of one or more sources of ultraviolet radiation. D6 is based on sources of ultraviolet radiation, whereas this system, although it supports landing operations on low visibility conditions has no relations with the present application, which does not use any systems based on ultraviolet radiation.

Document D7 presents a landing guide to aircraft in low visibility conditions from approach to landing, being an additional system for landing support, has the same reasons as D6 to have no relations with the present application.

BRIEF SUMMARY OF THE INVENTION

Figure 1:
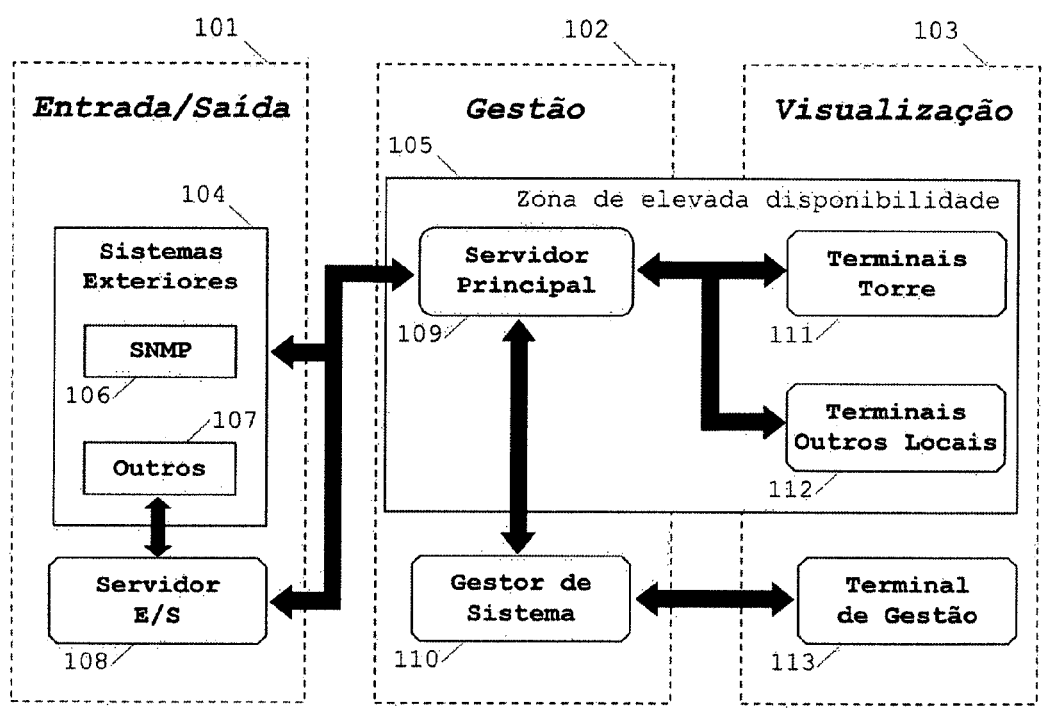
FIG. 1 is a block diagram illustrating the architecture of LVP system.

The present invention, entitled "Method to operate a system of categorization/degradation of operating procedures for low visibility (LVP) of an airport runway" refers to a method for operating an automatic system for categorizing or degrading the category of operation of an airport runway, while preserving the required operational security and includes a set of equipment and software applications.

The degradation of operation of airport category (lower the category) is carried out automatically by the system and the rise/fall of category is proposed to the controller that consequently makes the decision to rise/fall or not the category of operation of airport runway.

The system (called LVP) automatically and in real-time evaluates each of the equipment needed to operate the airport combining relevant information with information on weather conditions and consequently defines the maximum allowable category.

LVP system is based on a novel architecture which provides the necessary redundant operating conditions with the ability to quickly switch between devices in case of failure.

DETAILED DESCRIPTION OF THE INVENTION

The method is based on a set of actions:
(a) Monitor of the status of all systems related to low visibility operations and present it in a single screen;
(b) Define the appropriate category to the operation of the airport runway;
(c) Carry out automatically degradation (lowering) of the category of operation of the runway, if there is degradation in an essential system to the operation in that category;
(d) Perform manually categorization (increase) of the category of operation of the runway, if weather conditions require, the status of the systems allows and the operator decides to rise to a new category of operation;
(e) Perform manually lowering of the category of operation of the runway, if weather conditions permit and the operator decides to descend to a new category of operation;
(f) Uses an application "alive" with the purpose to manage the switching between the main servers.

The first action (a) performs status monitoring of all systems related to low visibility operations and presents this information on the same screen in terminals located in the control tower of the airport and elsewhere, also presenting technical information to technical support the operation of the airport.

The second action (b) defines the appropriate category to the operation of the airport runway, by a calculation where from the information collected on all systems supporting the low visibility operation, coupled with a set of parameters that characterize the boundary conditions for the categories of operation, determines which category is appropriate to the operation of the airport runway.

The method further comprises three actions (c, d, e) allowing the rise or fall of category. In the event of breakdown of an essential system to the category in operation of runway, is performed automatically the descent of category, as provided in the action (c). If weather conditions require an increase in the category of operation of the airport runway, if the condition of the equipment allows that rise and the operator decides rise the category, at the suggestion of the system, the rise of the category will be carried out manually according to the action (d). If weather conditions are allowing a fall in the category of operation of the airport runway and the operator decides the fall of category, the descent of category will be held in a manual way, according to action (e).

Finally, the method uses an application with the title 'alive' to manage switching between the main servers, which can be performed automatically upon failure of one of the two servers, or manually by operator's decision, according to action (f).

LVP system uses a set of equipment and software applications.

In terms of equipment the invention is divided into three main blocks (FIG. 1):

Input/Output block (101): Interface with External Systems (104), eg ILS, energy, airport, airport lights and radio aids, using SNMP (106)—Simple Network Management Protocol—or Other protocols (107). This area is managed by computer named I/O Server (108).

Management block (102): Responsible for the operational management of the system and its technical management, held respectively by two computers, one designated Main Server (109) and other System Manager (110).

Visualization block (103): Presentation of operational information for controllers using the terminals located in the air traffic control of the airport, called Tower Terminals (111) and installed elsewhere called Other Sites Terminals (112) and presentation of technical information to technical support of the airport on a terminal called a Management Terminal (113).

The Main Server (109) for operational management of the system and viewing area for terminal air controllers Terminal Tower (111) and Terminals Other Sites (112) are part of a critical area using high-performance technology, therefore are inserted on an area of high availability (105) as depicted in FIG. 1.

The system is distributed geographically into four areas (FIG. 2):

Equipment room (201)—Place where is installed all equipment associated with the airport air traffic control;

Control tower (202)—Airport control Tower where the terminals are installed to support air traffic controllers;

Other sites (203)—Other sites such as the control room, the air traffic control center and the central fire of the airport;

Technical management room (204)—Room where is performed the technical monitoring of all equipment associated with the air traffic control of the airport.

These geographical areas are linked through an Ethernet communications network.

Hardware Description

Figure 3:
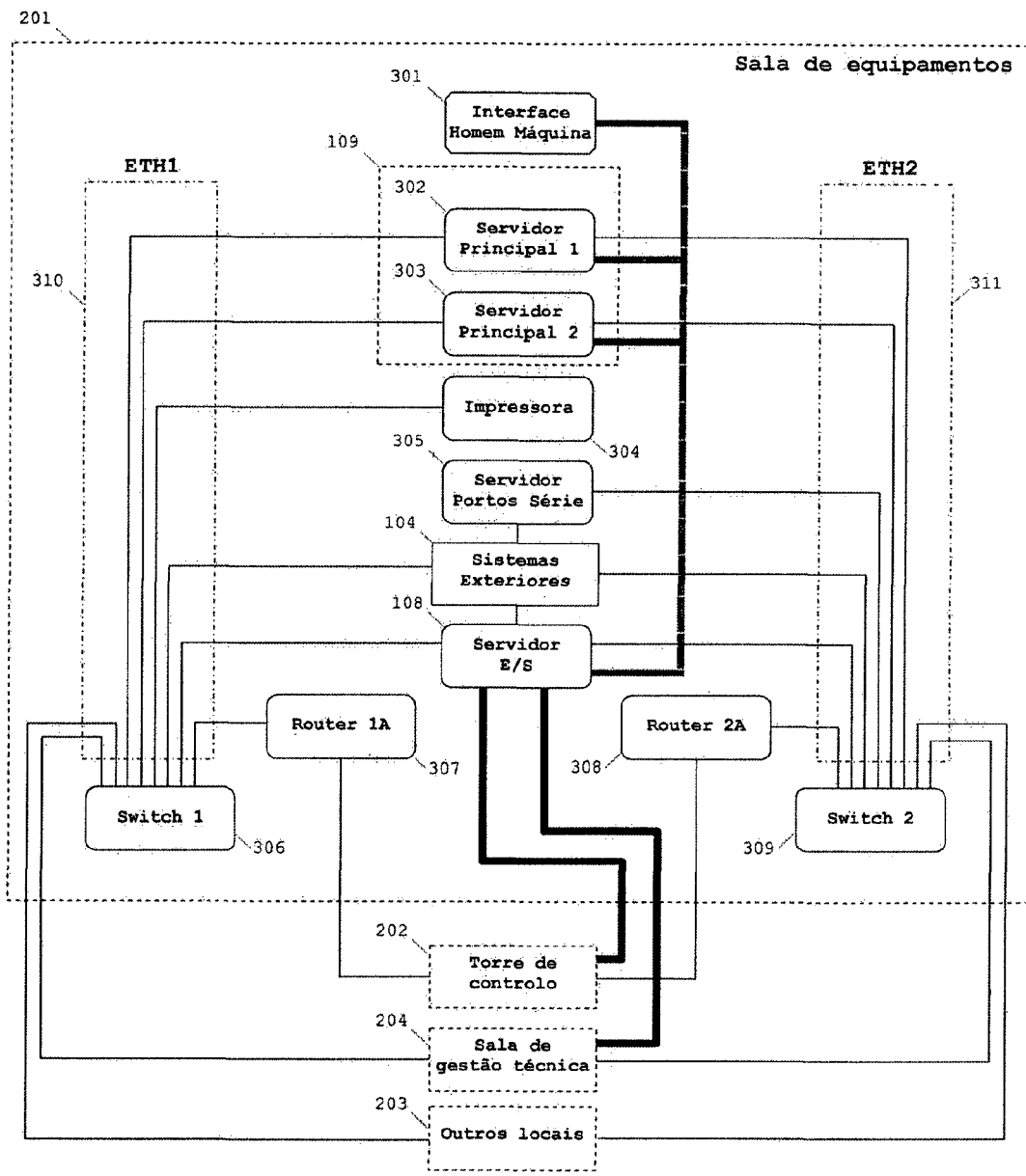
FIG. 3 is a block diagram which illustrates the equipment and connections in the equipment room.

The Equipment room (201) according to FIG. 3, contains the following hardware:

Human Machine Interface (301)—Controls the human machine interface (HMI) of the Main Server 1 and Main Server 2 (302, 303) and I/O Server (108) from a single monitor, keyboard and mouse. This device consists of a monitor, a keyboard, a mouse and a switch that lets the user select the server to control.

Main Server (109)—It is a group (cluster) of two servers (302, 303) that work as one. This redundant configuration allows that after a failure in the operational server (called MASTER), it is replaced by the redundant server (called a SLAVE).

Printer (304)—Equipment used to print reports and other information from servers (302, 303, 108).

Serial Ports Server (305)—Makes the interface with external systems and means of the airport using serial communication protocol, such as: meteorological system, airport lighting, energy power of the airport.

External Systems (104)—External equipment that is monitored by the system. These devices use various media, including serial communication and Ethernet network communication.

I/O Server (108)—Performs the processing of information from External Systems (104), the Control tower (202) and Technical management room (204).

Switch 1 (306)—Packet switch for network designated ETH1 (310) used to connect the following equipment: Main Server 1 (302), Main Server 2 (303), Printer (304), Router 1A (307), External Systems (104), Technical management room (204) and Other Sites (203).

Figure 2:
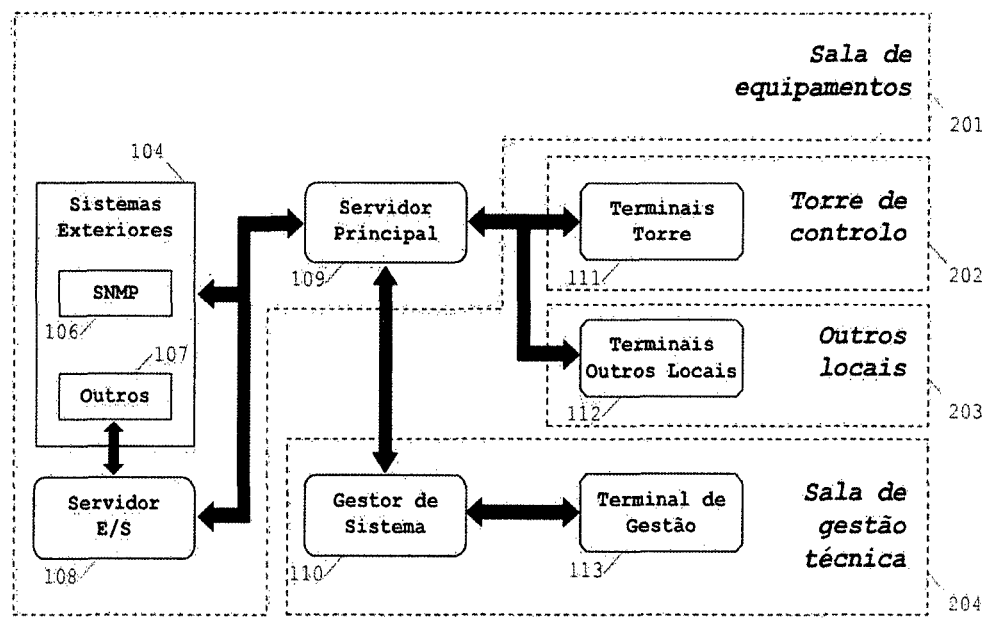
FIG. 2 is a block diagram which relates LVP system architecture with the different sites where the equipment is located.

Router 1A (307)—Network packets router used to communicate with the Tower Terminals (111) located in the Control tower, shown in FIG. 1 and FIG. 2. This equipment uses technology S.HDSL to communicate with the Control tower (202), extending network ETH1 (310) to this location;

Switch 2 (309)—Packet switch for network designated ETH2 (311) used to connect the following equipment: Main Server 1 (302) Main Server 2 (303), Serial Ports Server (305), Router 2A (308), External Systems (104), Technical management room (204) and Other Sites (203).

Router 2A (308)—Network packets router used to communicate with the Tower Terminals (111) located in the Control tower, shown in FIG. 1 and FIG. 2. This equipment uses technology S.HDSL to communicate with the Control tower (202), extending network ETH2 (311) to this location.

Networks ETH1 (310) and ETH2 (311) are two independent Ethernet networks that operate redundantly, ensuring that if one fails the other ensures communication between the different modules of the system.

Figure 4:
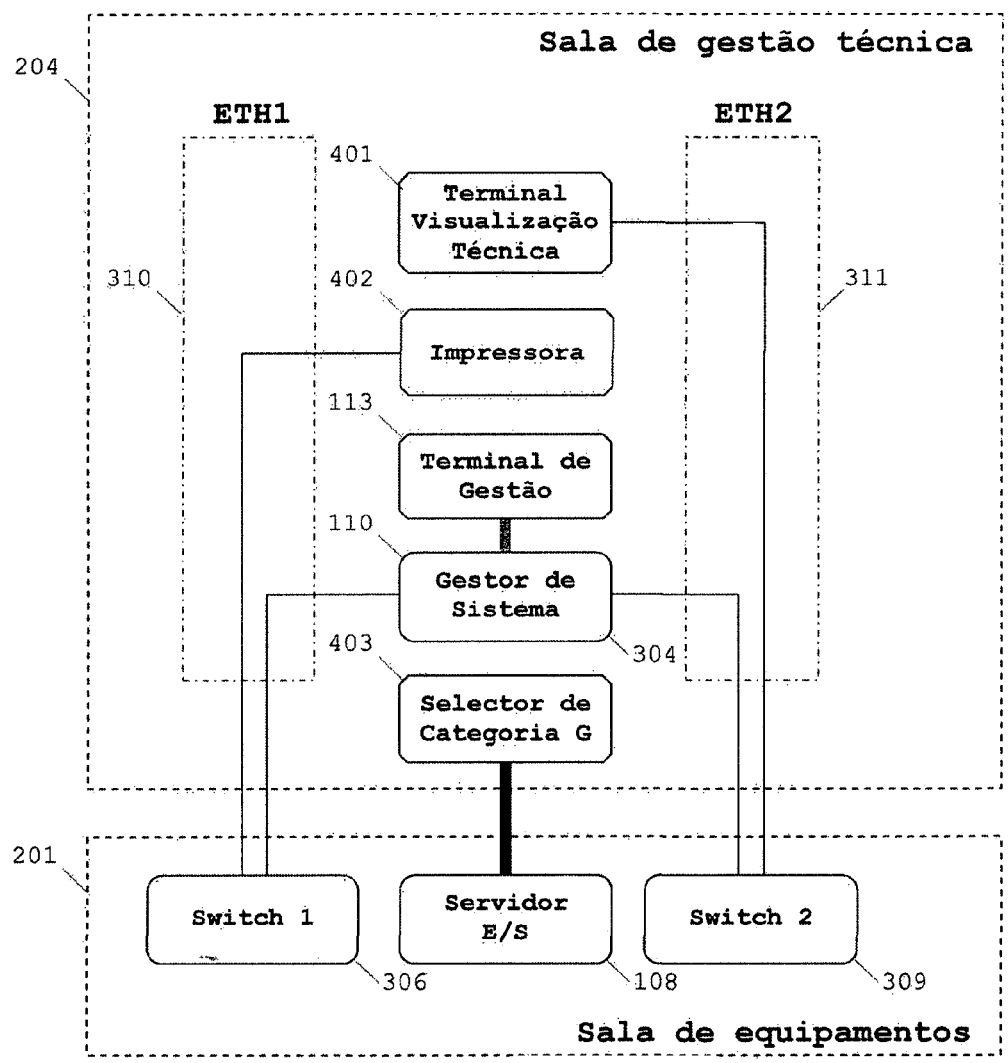
FIG. 4 is a block diagram which illustrates the equipment and connections in the technical management room.

The Technical management room (204), as shown in FIG. 4, contains the following hardware:

Technical Terminal (401)—Allows operators to visualize information about airport category of operation in resumed form.

Printer (402)—Equipment used to print reports and other information from the System Manager (110).

Management Terminal (113)—Terminal to display the information from System Manager (110). This device consists of a monitor, a keyboard and a mouse.

System Manager (110)—Server that performs technical management of LVP system.

Category Selector M (403)—Category selector located on Technical management room to select the airport category: NO CAT, CAT I, CAT II, CAT IIIA and CAT IIIB. This device is connected directly to I/O Server (108) of Equipment Room (201).

The printer (402) is connected through ETH1 network (310), the Technical Terminal (401) is connected through ETH2 network (311) and the System Manager (110) is connected redundantly via two networks, ETH1 (310) and ETH2 (311).

Figure 5:
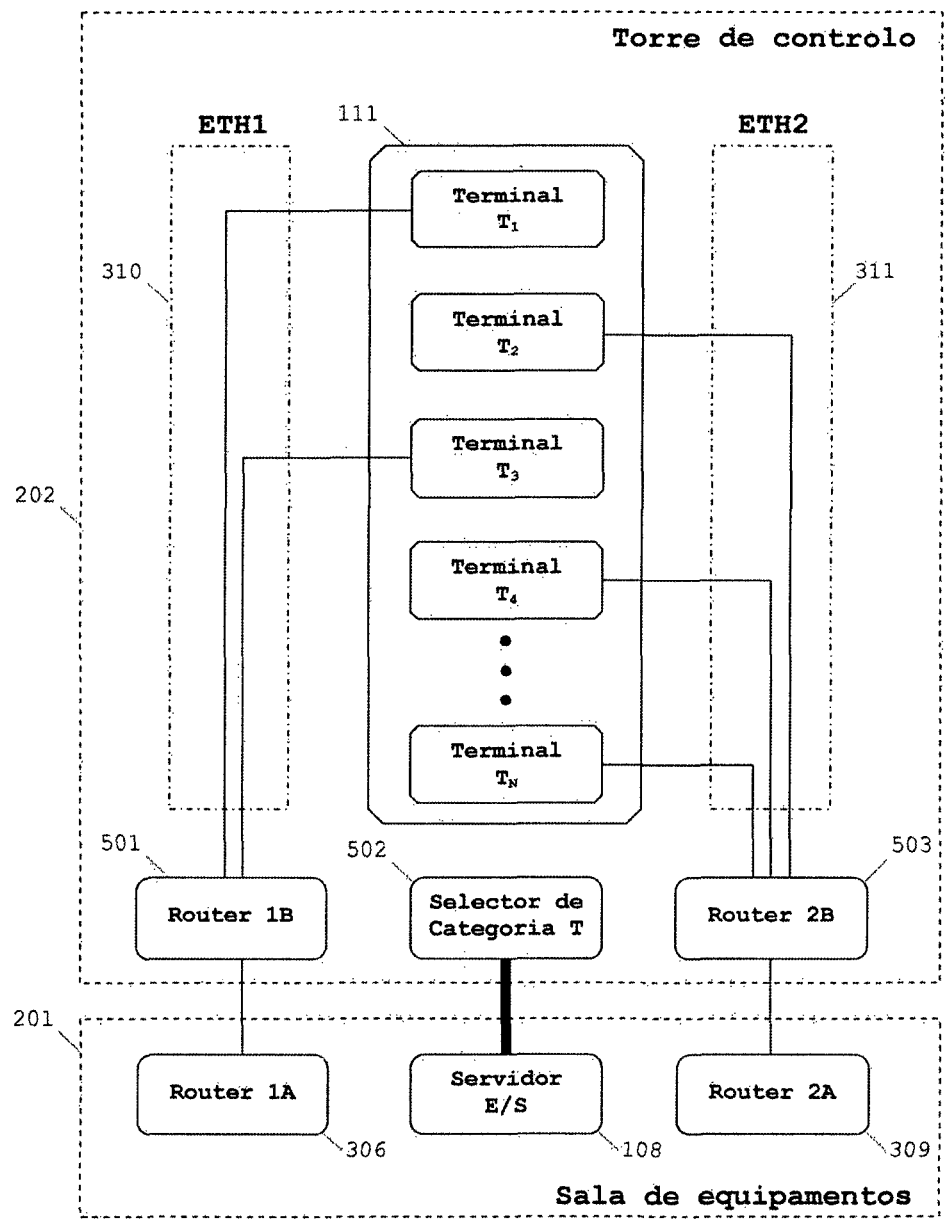
FIG. 5 is a block diagram which illustrates the equipment and connections in the control tower.

The control tower (202), as shown in FIG. 5, contains the following hardware:

Terminal T1 to TN (111)—Allows controllers to visualize the information on the airport category of operation in summary form. The number of terminals depends on the number of working positions of the control room of the airport and is connected to the Equipment room (201) alternately using networks ETH1 (310) and ETH2 (311), ensuring redundant links.

Router 1B (501)—Network packets router used to communicate with the servers of LVP system. This equipment uses S.HDSL technology to communicate with the Equipment room (201), extending the network ETH1 (310) to this location, as shown in FIG. 4.

Router 2B (503)—Network packets router used to communicate with the servers of LVP system. This equipment uses S.HDSL technology to communicate with the Equipment room (201), extending the network ETH2 (311) to this location, as shown in FIG. 4.

Category Selector T (502)—Category selector located on Control tower to select the airport category: NO CAT, CAT I, CAT II, CAT IIIA and CAT IIIB. This device is connected directly to I/O Server (108) of Equipment Room (201).

Figure 6:
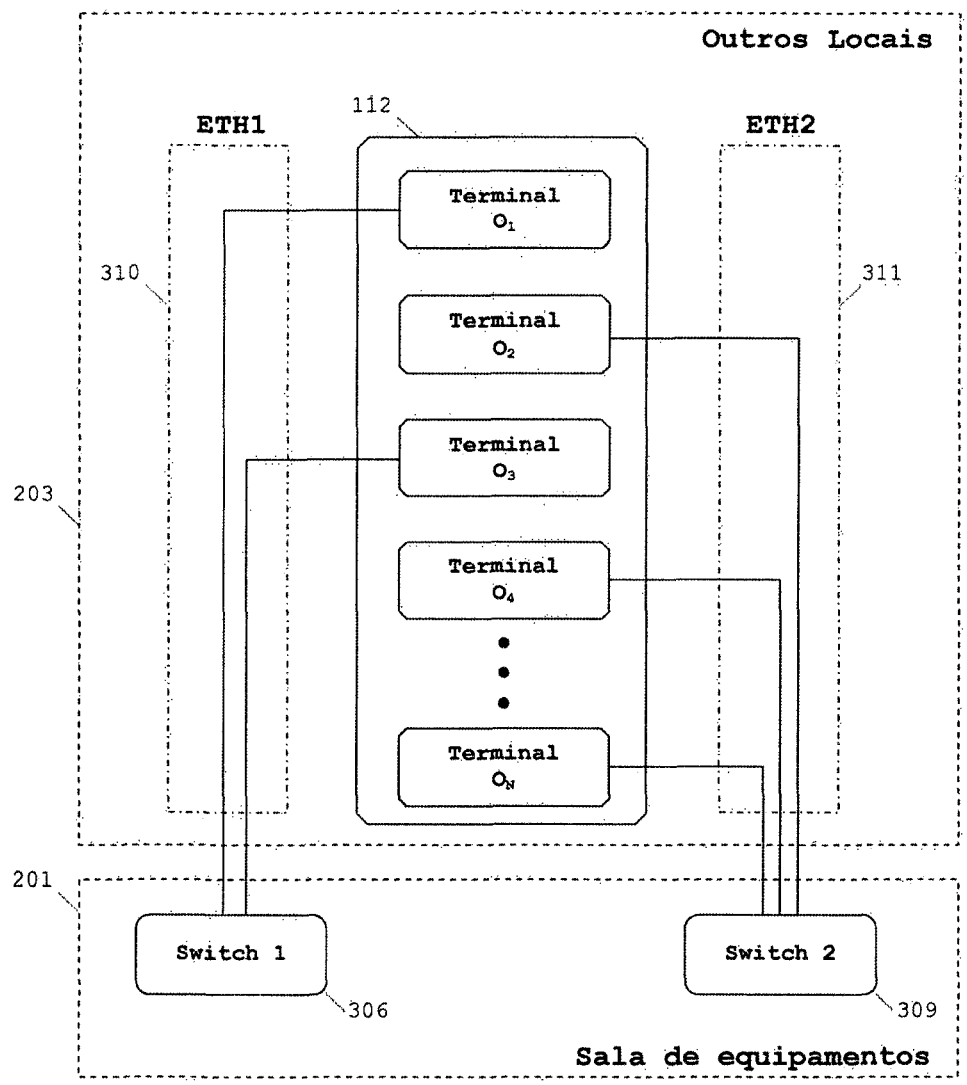
FIG. 6 is a block diagram that illustrates the equipment and connections in other locations.

The Other sites (203), as shown in FIG. 6, are places (besides the control tower) where are placed other terminals, such as the operating room for air traffic control and operating room for fire brigade, comprising the following hardware:

Terminal O1 to ON (112)—Allows the controllers or other operators to visualize information about airport category of operation in summary form, are linked to the Equipment room (201) alternately using networks ETH1 (310) and ETH2 (311), ensuring redundancy links.

Network Description

The Ethernet network is used to communicate between servers (302, 303, 108, 110) and the foreign systems (104) and to ensure redundancy is doubled (see FIG. 3 and FIG. 4).

The terminals T1 to TN and O1 to ON are connected to this network in such a way that has redundant links in case of failure of a communication network, there is always one terminal connected through one of the two networks, as illustrated in FIG. 5 (for the terminal control tower T1 to TN) and FIG. 6 (for terminals other local O1 to ON).

Software Description—Main Server

The Main Server (109) is the core processing of all information in LVP system that is presented to controllers and technical operators. The information comes mainly from External Systems (104) and I/O Server (108) (see FIG. 1).

Figure 7:
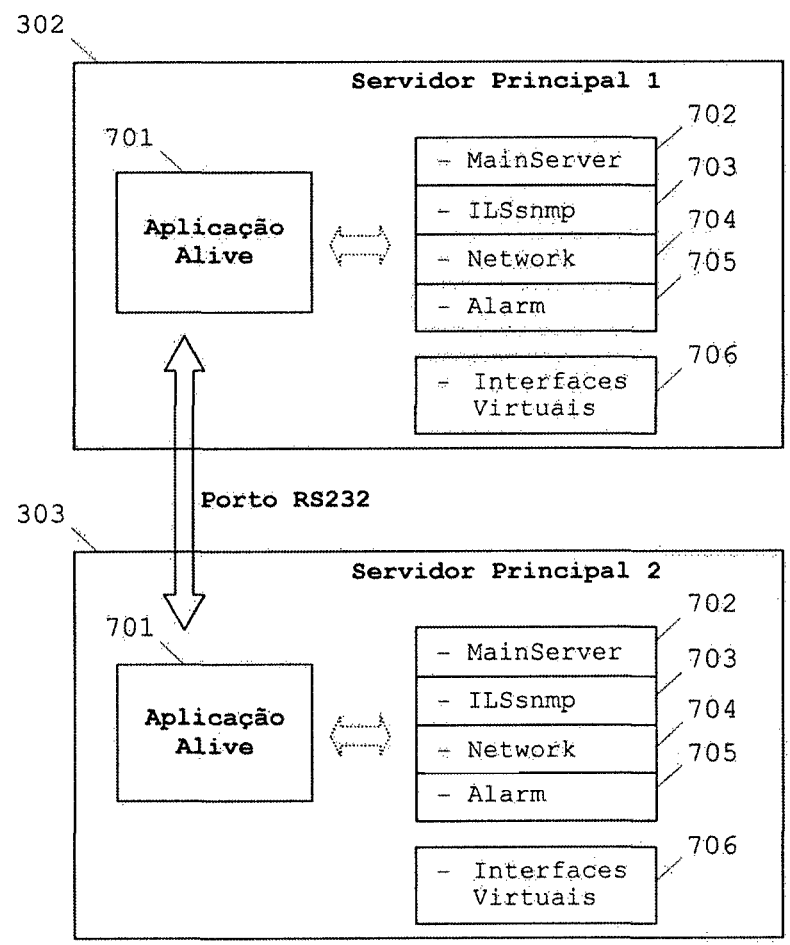
FIG. 7 is a block diagram illustrating the software applications for Main Server 1 and Main Server 2.

The applications developed for this server are shown in FIG. 7:

Alive application (701)—Application that manages the switching between Main Server 1 (302) and Main Server 2 (303). The server operation is referred to as MASTER and the server that is not operational is called SLAVE. The server switching is performed in a manual way or after MASTER server failure;

MainServer application (702)—Processes information from External Systems (104) and I/O Server (108) to perform the following functions:
  calculate the category of operation of the airport according to the condition of the External Systems (104) required for the operation of airport runway and the settings of LVP system;
  statistics calculation of operating equipment for the External Systems (104);
  suggestion for the category of operation of the airport under the atmospheric conditions and settings of LVP system;
  construction of pages to terminals T1 to TN and O1 to ON;

ILSsnmp (703)—Application the interfaces with External Systems (104), using SNMP (Simple Network Management Protocol) communication protocol for reading the status of the equipment;

Network (704)—application that tests the connectivity of network equipment;

Alarm (705)—Application for the management of alarms.

The communication between main server and other modules is accomplished through Virtual Interfaces (706), which are generated in the MASTER server for that purpose.

The Main Server (109) is a group of two computer machines (cluster) with a redundant configuration that allows the failure of the server in operation (MASTER), which is automatically replaced by another server (SLAVE) that is waiting to come into operation.

'Alive' Application

Figure 8:
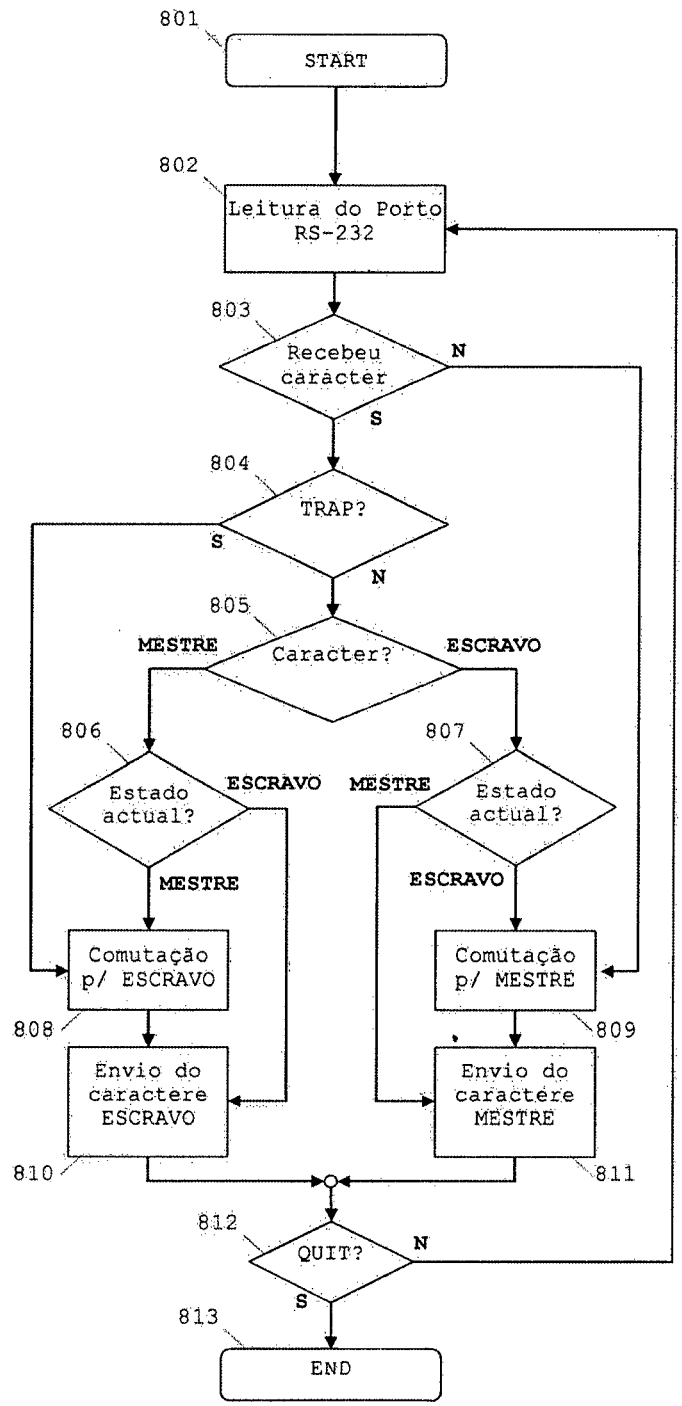
FIG. 8 is a flowchart of the algorithm of 'Alive' application.

The 'Alive' application, presented in FIG. 8, manages the switching mode of one of the main servers from MASTER to SLAVE mode and the other server from SLAVE to MASTER mode, assuming the last server the operation of the system.

This application is runs concurrently on the designated Main Server module (109) comprising two servers—Main Server 1 (302) and Main Server 2 (303).

The application 'Alive' in the operational server (MASTER mode) initiates the operation of the following applications: MainServer (702) Network (703), ILSSnmp (704) and Alarm (705), and activates the Virtual Interfaces (706). The server that is operating in SLAVE mode the Application 'Alive' stops the operation applications MainServer (702), ILSsnmp (703), Network (704) and Alarm (705), and disables the Virtual Interfaces (706).

The switching process can be performed manually or automatically. The manual switching is performed by an operator and automatic switching occurs when the server that operates in MASTER mode fails or crashes, the server that is operating in SLAVE mode switches immediately and automatically to MASTER mode of operation.

FIG. 8 illustrates the flowchart of 'Alive' application that performs the following steps:

(801) Start of application, with implementation of the following:
  reading of configuration parameters;
  if detects no reception of character starts the server as MASTER and if detects the reception character begins as SLAVE;
(802) Reading RS232 port, checking the mode of operation of the other server;
(803) Tests whether received characters;
(804) Tests whether the received signal is a TRAP type;
(805) Tests the type of character received: MASTER OR SLAVE;
(806, 807) Tests the current mode of the server: MASTER or SLAVE;
(808) Switches the server to SLAVE mode: stop the main server applications (702-705) and disables the Virtual Interfaces (706);
(809) Switches the server to MASTER mode: start the main server applications (702-705) and activates the Virtual Interfaces (706);
(810) Send character SLAVE by RS232 port;
(811) Send character MASTER by RS232 port;
(812) Tests whether a signal received QUIT to exit;
(813) Application exits (END).

'MainServer' Application

Figure 9:
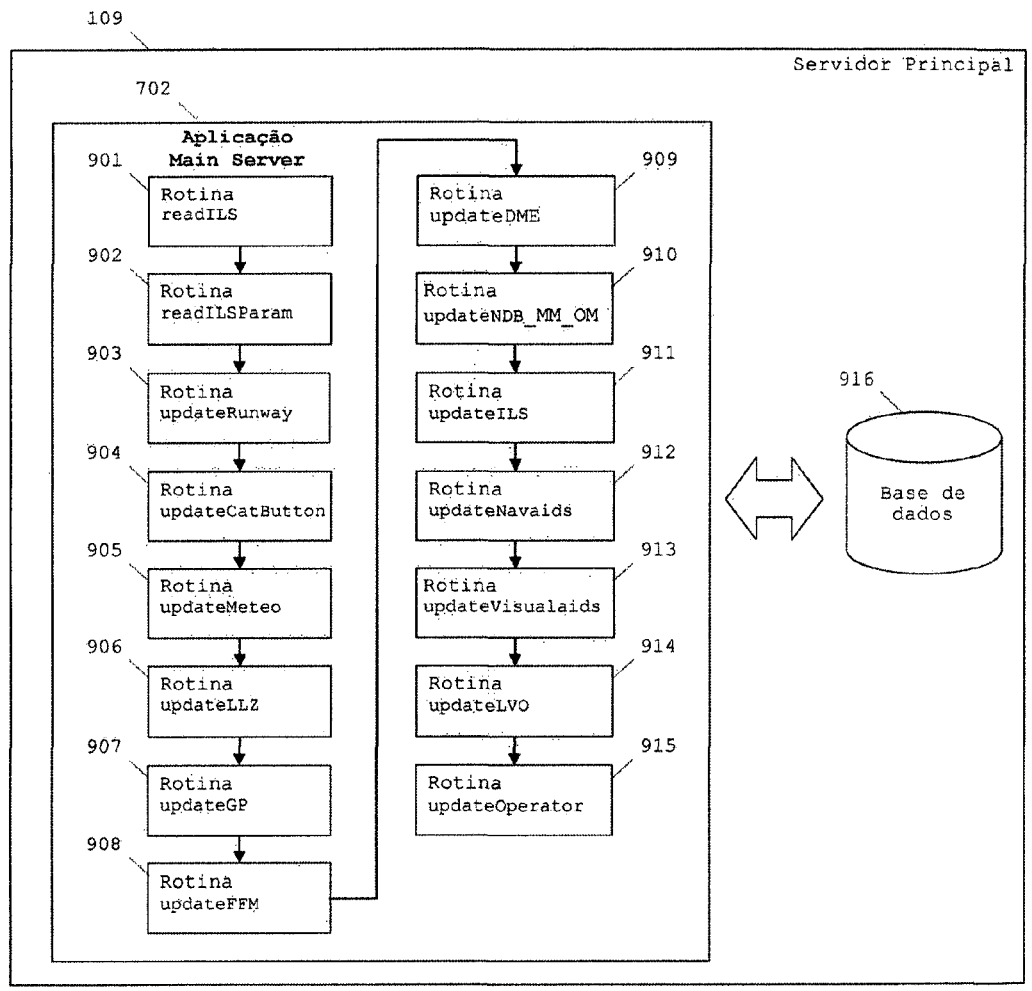
FIG. 9 is a block diagram of 'mainserver' application.

The 'MainServer' application (702), shown in FIG. 9, implements the main processing of LVP system, which consist of the reading of the status of different equipment and the calculation of the category of operation of the airport runway.

The application stores all the information in a database (916) and run through the following routines:
  (901) readILS—Reads of all data from system ILS (Instrument Landing System);
  (902) ReadILSParam—Reads of ILS system parameters;
  (903) updateRunway—Updates information about which runway is in operation;
  (904) updateCatButton—Updates information about the position of category selector;
  (905) updateMeteo—Updates information of the meteorological conditions of airport runway;
  (906) updateLLZ—Updates information from Localizer—LLZ (subsystem of ILS system for support in low visibility operation);
  (907) updateGP—Updates information from Glide Path—GP (subsystem of ILS system for support in low visibility operation);
  (908) updateFFM—Updates information from Far Field Monitor—FFM (subsystem of ILS system for support in low visibility operation);
  (909) updateDME—Updates information from Distance Measuring Equipment—DME (system for support in low visibility operation);
  (910) updateNDB_MM_OM—Updates information from Non-Directional Beacon—NDB, Middle Marker—MM and Outer Marker—OM (systems for support in low visibility operation);
  (911) updateILS—Updates all the information from the ILS system;
  (912) updateNavaids—Updates all the information from navigation aid systems;
  (913) updateVisualaids—Updates all the information from the visual landing aid systems at the airport;
  (914) updateLVP—Performs all necessary calculations to determine the appropriate category of operation of airport runway, depending on the status of all equipment and weather conditions for the runway in operation;

(915) updateOperator—Performs the update of the information to be presented to the controllers of the airport via the terminals of the Control tower (202)—Terminal T1 to Terminal TN, as well as those from other sites (203)—Terminal O1 to Terminal TN, and Technical Terminal (402) installed in the Technical management room (204).

'ILSsnmp' Application

Figure 10:
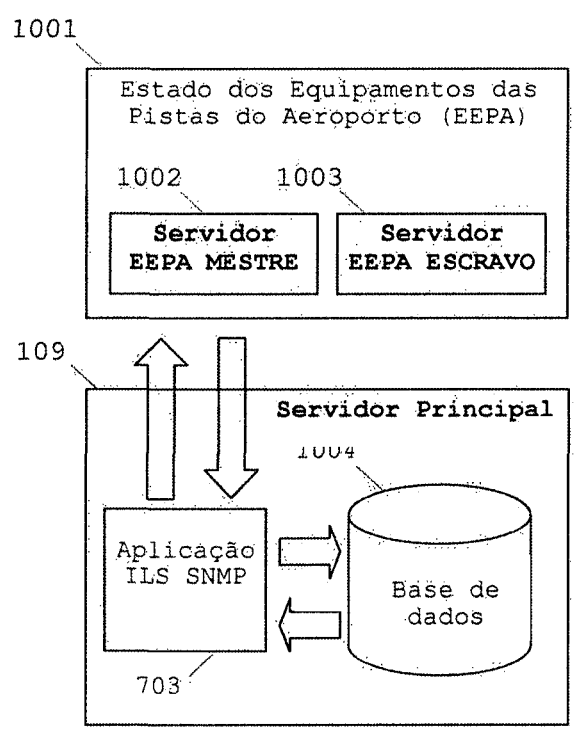
FIG. 10 is a block diagram of 'ILSSnmp' application.

The 'ILSsnmp' application (703), shown in FIG. 10, runs on Main Server (109) and makes de management of the information management of Airport Runways Equipment Status (ARES) (1001), storing this information in the correspondent database (1004).

The ARES is obtained from two redundant servers: ARES MASTER Server (1002) and ARES SLAVE Server (1003).

Figure 11:
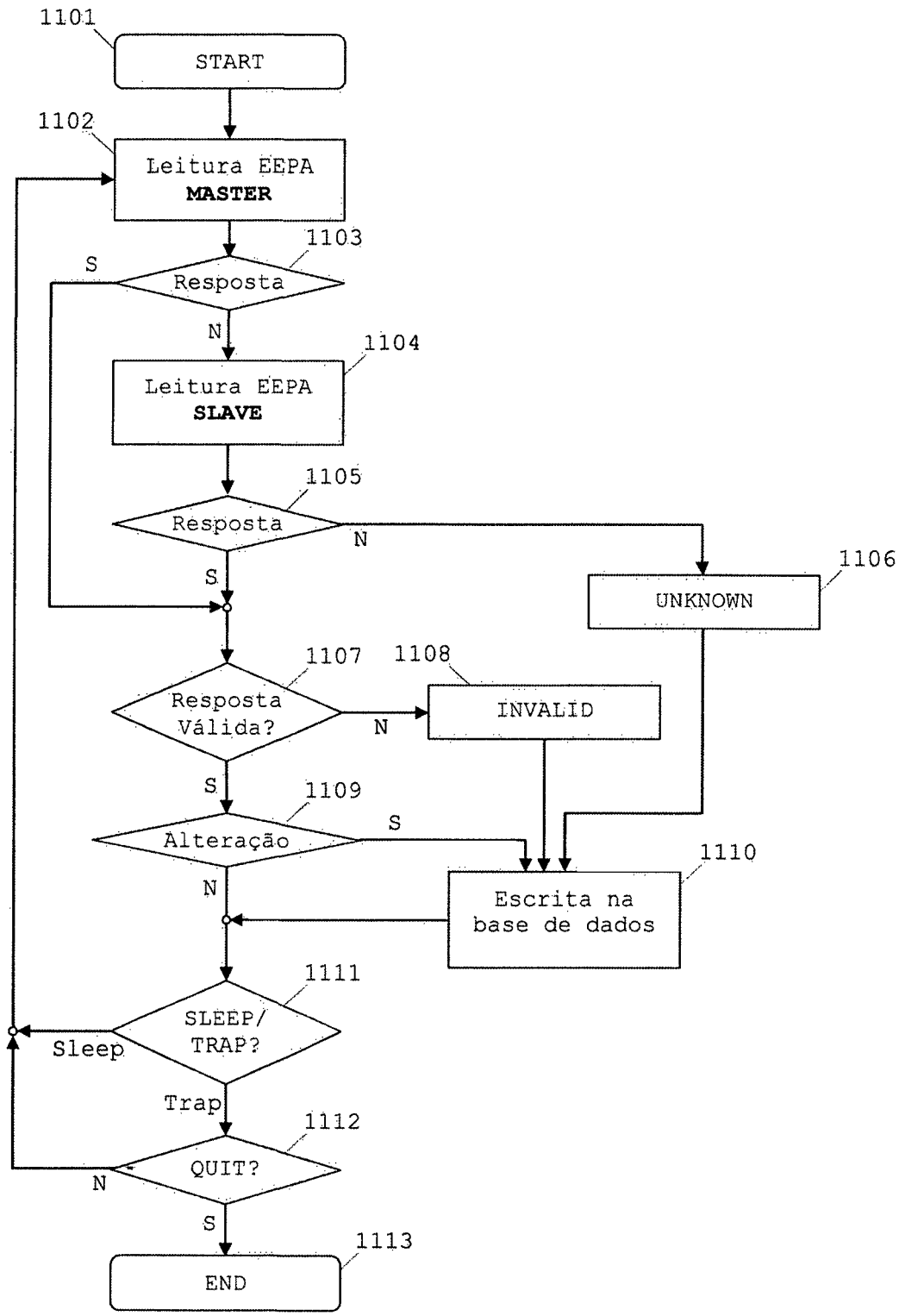
FIG. 11 is a flowchart of 'ILSSnmp' application.

FIG. 11 illustrates the flowchart of ILSsnmp application that performs the following steps:

(1101) Start of application, with implementation of the following operations:
reading of configuration parameters;
(1102) Read the status of the server equipment ARES MASTER;
(1103) Tests if response has been received;
(1104) Read the status of the server equipment ARES SLAVE;
(1105) Tests if response has been received;
(1106) Preparation of unknown data ("Unknown") to write in the DataBase;
(1107) Tests whether the response is valid;
(1108) Preparation of invalid data ("Invalid ") to write in the DataBase;
(1109) Checks change of data;
(1110) Write in the database the status of the equipment ARES where there has been change to data, write "Unknown" or "Invalid" if the data is unknown or invalid, respectively;
(1111) Waits for a period of time ("Sleep") or the arrival of a message of interrupt ("Trap");
(1112) Checks an interrupt message ("Trap"), means to exit the program ("Quit");
(1113) Application exits (END).

'Network' Application

Figure 12:
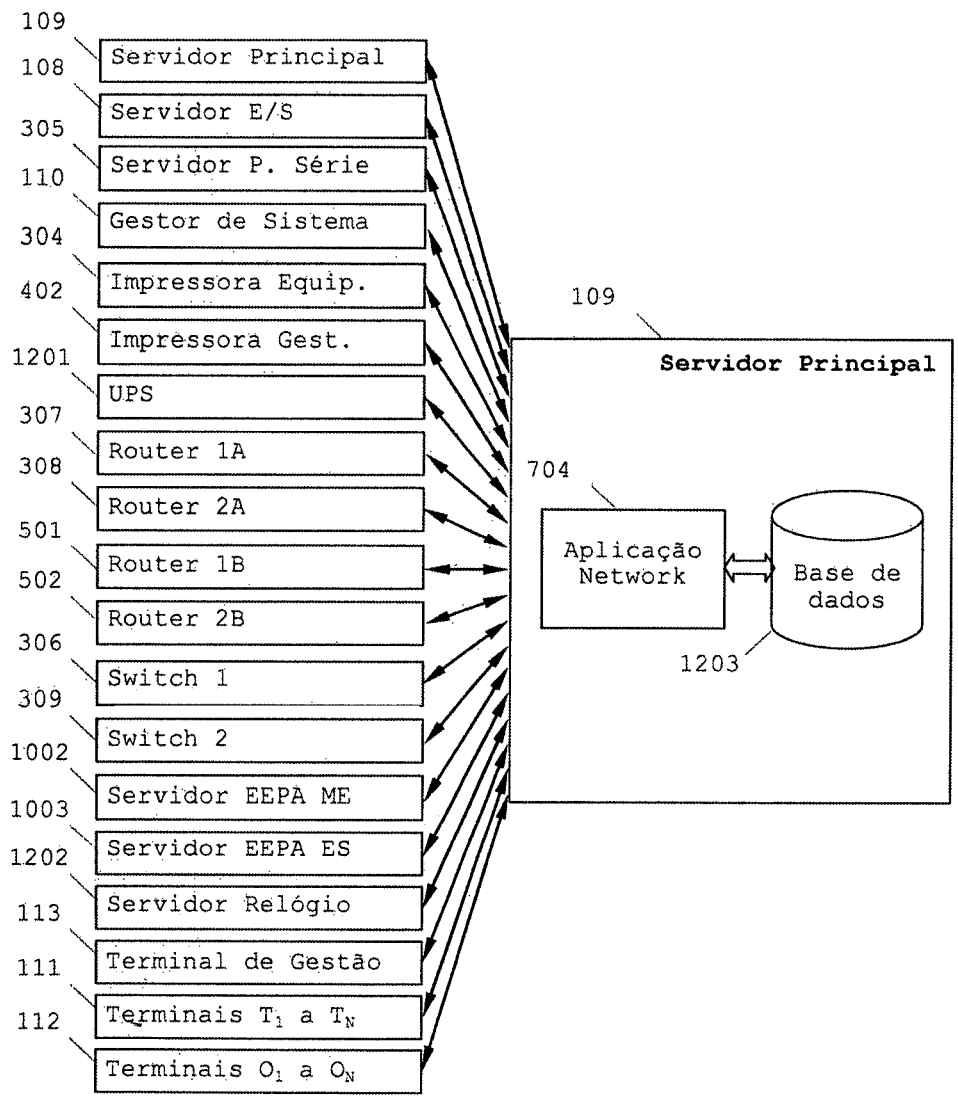
FIG. 12 is a block diagram of 'Network' application.

The 'Network' application (704), shown in FIG. 12, runs on Main Server (109) and has the function to check the status of all equipment from system LVP, storing this information in the DataBase (1203).

The process of checking the status of the equipment is done through the network command Ping sent to each element and waiting for a response. If there come any response will be signaled an alarm to the element that is being tested. In case of failure to the Ping command this operation is repeated two more times so that the Ping may be performed three times.

The elements in test are:
(109) Main Server, including Main Server 1 (302) and Main Server 2 (303);
(108) I/O Server;
(305) Serial Ports Server;
(110) System Manager;
(304) Printer of Equipment room (201);
(402) Printer of Technical management room (204);
(1201) Uninterruptible Power Supply (UPS);
(307) Router 1A located in the Equipment room (201);
(308) Router 2A located in the Equipment room (201);
(501) Router 1B located in the Control tower (202);
(502) Router 2B located in the Control tower (202);
(306) Switch 1 located in the Equipment room (201);
(309) Switch 2 located in the Equipment room (201);
(1002) ARES MASTER Server;
(1003) ARES SLAVE Server;
(1202) Server for clock synchronization;
(113) Management Terminal;
(111) Terminals T1 to TN;
(112) Terminals O1 to ON.

Figure 13:
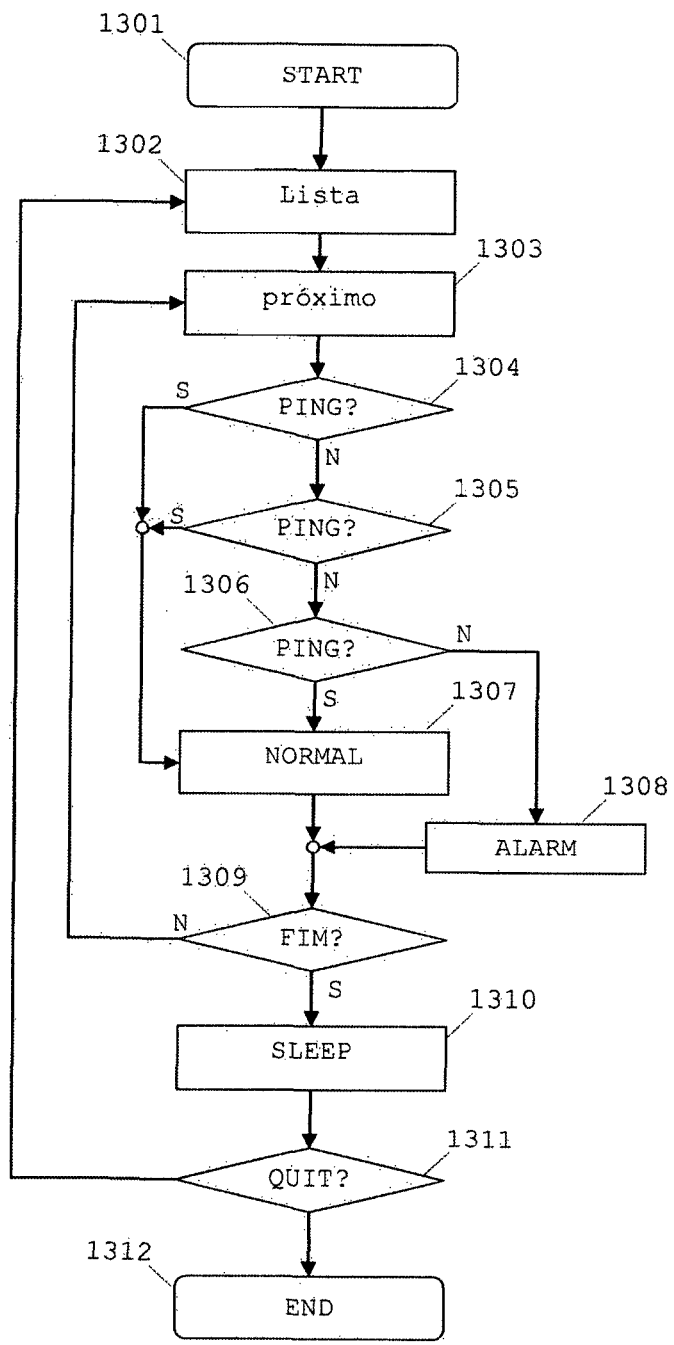
FIG. 13 is a flowchart of 'Network ' application.

FIG. 13 shows the flowchart of 'Network' application that executes the following instructions:
(1301) Start of application, with implementation of the following operations :
reading of configuration parameters;
(1302) Get the list of all LVP system equipment;
(1303) Get the next element in the list of all LVP system equipment, the element to be tested;
(1304) Send Ping to the element under test and verify the response;
(1305) Submit a second Ping command to the element under test and verify the response;
(1306) Submit a second Ping command to the element under test and verify the response;
(1307) If there is a response to Ping command it will be registered that the equipment is in 'NORMAL' status;
(1308) If the Ping command have not been answered it will be registered that the equipment is in 'ALARM' status;
(1309) Checks if already covered all the equipment list;
(1310) Waits for a period of time ("Sleep");
(1311) Check if there is an interrupt to program ("Quit");
(1312) Application exits (END).

'Alarm' Application

The 'Alarm' application (705) processes the alarms from external systems and from LVP system, presents them in the Management Terminal (113) and print them on the printer (304) of the Equipment room (201).

Virtual Interfaces

The communication between any element of the system and the Main Server (109) is accomplished through Ethernet TCP/IP communication protocol, called Virtual Interfaces (706).

For the fastest switching between servers in the event of a fault, the server communication interfaces, on Main Server 1 (302) and Main Server 2 (303), are in operation, while the MASTER server interface is enabled and the SLAVE server interface is disabled.

In case of failure of the server that is in MASTER mode, the server that is in SLAVE mode activates its virtual interfaces, achieving the switch of the servers (SLAVE to MASTER and MASTER to SLAVE) in a short time interval. The server changes from MASTER to SLAVE mode disabling its virtual interfaces.

The invention claimed is:

1. A method for operating a categorization/degradation system of operating procedures for low visibility (LVP) of an airport runway, comprising the steps of:
monitoring a status of all systems related to low visibility operations;
presenting the status of all systems related to low visibility operations on a single screen;
defining a category to the operation of the airport runway appropriate to weather conditions of the airport runway and all systems related to low visibility operations;

automatically lowering the category of operation of the airport runway upon the detection of a degradation in a system essential to the operation of the airport runway in that category;

manually increasing the category of operation of the airport runway, if weather conditions require, in response to an operator raising to a new category of operation subject to the status of the systems allowing said raise;

manually lowering the category of operation of the airport runway, if weather conditions permit in response to the operator descending to the new category of operation; and switching between servers upon detection of a failure of one of the servers.

2. The method of claim 1, wherein the step of presenting the status of all systems related to low visibility operations includes using terminals located in an airport control tower and terminals located at other sites, and further includes providing technical information to technical support operations in the airport terminal.

3. The method of claim 1, wherein the step of defining a category to the operation of the airport runway is based on calculations using the status information collected from all systems that support the low visibility operation, combined with a set of limit parameters of the categories of operation.

4. The method of claim 1, wherein the steps of automatically lowering, manually increasing, and manually decreasing the category of operation of the airport runway includes the steps of analyzing in real time the systems necessary for low visibility operation of the airport, combining the obtained information with weather conditions information, and defining the category appropriate to the operation on the airport runway.

5. The method of claim 1, wherein the step of switching between servers is performed manually or automatically, with the manual switching being carried out by an operator, and the automatic switching occurring when a first server in a MASTER state operation crashes and the system switches to a second server in a SLAVE state operation, and further including the step of changing the second server to the MASTER state operation.

6. The method of claim 1, further comprising using an architecture based on a management block, an input/output block, and a visualization block that define the LVP system, a main server, tower termins, and terminals located at other sites.

* * * * *